US008767903B2

(12) United States Patent
Seidel et al.

(10) Patent No.: US 8,767,903 B2
(45) Date of Patent: Jul. 1, 2014

(54) WIRELESS IN-CORE NEUTRON MONITOR

(75) Inventors: John G. Seidel, Pittsburgh, PA (US); Robert W. Flammang, Pittsburgh, PA (US); Jorge V. Carvajal, Irwin, PA (US); Michael A. James, Harmony, PA (US); Nicola G. Arlia, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 803 days.

(21) Appl. No.: 12/986,242

(22) Filed: Jan. 7, 2011

(65) Prior Publication Data

US 2012/0177166 A1 Jul. 12, 2012

(51) Int. Cl.
*G08B 7/06* (2006.01)
*G21C 17/10* (2006.01)
*G08C 19/00* (2006.01)
*G21C 17/108* (2006.01)
*G08B 7/00* (2006.01)
*G21C 17/00* (2006.01)

(52) U.S. Cl.
CPC .............. *G21C 17/108* (2013.01); *G21C 17/10* (2013.01)
USPC ...... 376/245; 376/254; 376/255; 340/870.01; 340/870.07; 340/870.16; 340/870.17

(58) Field of Classification Search
USPC ......... 376/153–155, 245, 254–255, 463, 207, 376/219, 236; 118/715; 324/200, 207.11, 324/207.25; 250/252.1, 253–266, 336.1, 250/390.01–362; 73/862, 862.381, 862.68; 340/870.01, 870.07, 870.11, 870.16, 340/870.17
See application file for complete search history.

(56) References Cited

U.S. PATENT DOCUMENTS

| | | | | |
|---|---|---|---|---|
| 2,859,353 A | | 11/1958 | Cox | |
| 3,780,292 A | * | 12/1973 | Klar | 376/255 |
| 3,932,211 A | * | 1/1976 | Loving, Jr. | 376/255 |
| 3,982,131 A | * | 9/1976 | Haller | 376/254 |
| 4,255,234 A | * | 3/1981 | Neuner et al. | 376/254 |
| 4,288,291 A | * | 9/1981 | Cisco et al. | 376/153 |
| 4,344,169 A | | 8/1982 | Snedkerud | |
| 4,943,683 A | * | 7/1990 | Utsunomiya et al. | 376/245 |
| 5,225,149 A | * | 7/1993 | Banda | 376/255 |
| 5,251,242 A | * | 10/1993 | Impink et al. | 376/254 |
| 5,270,574 A | | 12/1993 | Boysel | |
| 5,297,174 A | * | 3/1994 | Impink et al. | 376/236 |
| 5,745,538 A | | 4/1998 | Heibel | |
| 5,969,639 A | * | 10/1999 | Lauf et al. | 340/870.17 |

(Continued)

FOREIGN PATENT DOCUMENTS

DE 4120298 A1 * 12/1992 .......... G21C 17/112

OTHER PUBLICATIONS

U.S. Appl. No. 12/577,789, filed Oct. 13, 2009, R.W. Morris.

(Continued)

*Primary Examiner* — Bernarr Gregory
(74) *Attorney, Agent, or Firm* — Richard J. Coldren; Westinghouse Electric Company LLC

(57) ABSTRACT

An in-core neutron monitor that employs vacuum microelectronic devices to configure an in-core instrument thimble assembly that monitors and wirelessly transmits a number of reactor parameters directly from the core of a nuclear reactor without the use of external cabling. The in-core instrument thimble assembly is substantially wholly contained within an instrument guide tube within a nuclear fuel assembly.

16 Claims, 9 Drawing Sheets

(56) References Cited

U.S. PATENT DOCUMENTS

| | | | |
|---|---|---|---|
| 6,948,388 B1* | 9/2005 | Clayton et al. | 73/862.68 |
| 8,445,839 B2* | 5/2013 | Holaday et al. | 250/252.1 |
| 2005/0092246 A1* | 5/2005 | Baumann et al. | 118/715 |
| 2005/0225415 A1 | 10/2005 | Mahony et al. | |
| 2009/0154633 A1 | 6/2009 | Fawks, Jr. | |
| 2009/0174397 A1* | 7/2009 | Leclerc | 324/207.25 |
| 2010/0096556 A1 | 4/2010 | Arsalan et al. | |
| 2011/0002432 A1 | 1/2011 | Heibel et al. | |

OTHER PUBLICATIONS

International Preliminary Report on Patentability for PCT/US2011/021783 dated Jul. 10, 2013 (Form PCT/IB/373, Form PCT/ISA/237).

Written Opinion of the International Searching Authority for PCT/US2011/021783 dated Apr. 25, 2011 (Form PCT/ISA/237).

* cited by examiner

WIRELESS IN-CORE NEUTRON MONITOR

CROSS REFERENCE TO RELATED APPLICATIONS

This application is related to U.S. patent application Ser. No. 12/986,217, entitled SELF-POWERED WIRELESS IN-CORE DETECTOR, filed Jan. 7, 2011, concurrently herewith, now U.S. Pat. No. 8,681,920.

BACKGROUND OF THE INVENTION

1. Field of the Invention

The present invention pertains generally to apparatus for monitoring the radiation within the core of a nuclear reactor and, more particularly, to such apparatus that will not obstruct refueling of the reactor.

2. Related Art

In many state-of-the-art nuclear reactor systems in-core sensors are employed for measuring the radioactivity within the core at a number of axial elevations. These sensors are used to measure the radial and axial distribution of the power inside the reactor core. This power distribution measurement information is used to determine whether the reactor is operating within nuclear power distribution limits. The typical in-core sensor used to perform this function is a self-powered detector that produces an electric current that is proportional to the amount of fission occurring around it. This type of sensor does not require an outside source of electrical power to produce the current and is commonly referred to as a self-powered detector and is more fully described in U.S. Pat. No. 5,745,538, issued Apr. 20, 1998, and assigned to the Assignee of this invention. FIG. 1 provides a diagram of the mechanisms that produce the current I(t) in a self-powered detector element 10. A neutron sensitive material such as vanadium is employed for the emitter element 12 and emits electrons in response to neutron irradiation. Typically, the self-powered detectors are grouped within instrumentation thimble assemblies. A representative in-core instrumentation thimble assembly is shown in FIG. 2. The signal level generated by the essentially non-depleting neutron sensitive emitter element 12 shown in FIG. 1, is low, however, a single, full core length neutron sensitive emitter element provides an adequate signal without complex and expensive signal processors. The proportions of the full length signal generated by the single neutron sensitive emitter element attributable to various axial regions of the core are determined from apportioning the signal generated by different lengths of gamma sensitive elements 14 which define the axial regions of the core and are shown in FIG. 2. The apportioning signals are ratioed which eliminates much of the effects of the delayed gamma radiation due to fission products. The in-core instrumentation thimble assemblies also include a thermocouple 18 for measuring the temperature of the coolant exiting the fuel assemblies. The electrical signal output from the self-powered detector elements and the thermocouple in each in-core instrumentation thimble assembly in the reactor core are collected at the electrical connector 20 and sent to a location well away from the reactor for final processing and use in producing the measured core power distribution.

FIG. 3 shows an example of a core monitoring system presently offered for sale by Westinghouse Electric Company LLC with the product name WINCISE™ that employs fixed in-core instrumentation thimble assemblies 16 within the instrument thimbles of fuel assemblies within the core to measure the core's power distribution. Cabling 22 extends from the instrument thimble assemblies 16 through the containment seal table 24 to a signal processing cabinet 26 where the outputs are conditioned, digitized and multiplexed and transmitted through the containment walls 28 to a computer workstation 30 where they can be further processed and displayed. The thermocouple signals from the in-core instrumentation thimble assemblies are also sent to a reference junction unit 32 which transmits the signals to an inadequate core cooling monitor 34 which communicates with the plant computer 36 which is also connected to the workstation 30. Because of the hostile environment, the signal processing cabinet 26 has to be located a significant distance away from the core and the signal has to be sent from the detector 16 to the signal processing cabinet 26 through specially constructed cables that are extremely expensive and the long runs reduce the signal to noise ratio. Unfortunately, these long runs of cable have proved necessary because the electronics for signal processing has to be shielded from the highly radioactive environment surrounding the core region.

In previous nuclear plant designs, the in-core detectors entered the reactor vessel from the lower hemispherical end and entered the fuel assemblies instrumentation thimble from the bottom fuel assembly nozzle. In at least some of the current generation of nuclear plant designs, such as the AP1000 nuclear plant, the in-core monitoring access is located at the top of the reactor vessel, which means that during refueling all in-core monitoring cabling will need to be removed before accessing the fuel. A wireless in-core monitor that is self-contained within the fuel assemblies and wirelessly transmits the monitored signals to a location remote from the reactor vessel would allow immediate access to the fuel without the time-consuming and expensive process of disconnecting, withdrawing and storing the in-core monitoring cables before the fuel assemblies could be accessed, and restoring those connections after the refueling process is complete. A wireless alternative would thus save days in the critical path of a refueling outage. A wireless system also allows every fuel assembly to be monitored, which significantly increases the amount of core power distribution information that is available.

However, a wireless system requires that electronic components be located at or very near the reactor core where gamma and neutron radiation and high temperatures would render semiconductor electronics inoperable within a very short time. Vacuum tubes are known to be radiation insensitive, but their size and current demands have made their use impractical until recently. Recent developments in micro-electromechanical devices have allowed vacuum tubes to shrink to microscopic sizes and significantly reduced power draw demands.

Accordingly, it is an object of this invention to improve the critical path for refueling a reactor by significantly reducing the number of cables attached to the reactor head that would have to be removed and reconnected in the course of the refueling process.

It is a further object of this invention to provide a fuel assembly with a self-contained instrument thimble assembly that can be inserted into the core of a nuclear reactor and placed in operation without the necessity of routing cabling and connectors through the reactor vessel to activate the instrumentation.

It is an additional object of this invention to increase the amount of in-core power distribution data that is communicated to the plant operator.

SUMMARY OF THE INVENTION

These and other objectives are achieved by the apparatus of this invention which avoids the necessity of running expensive electrical cables through the reactor head and reactor internals to connect with and energize the in-core instrumentation. In accordance with this invention, a nuclear reactor in-core detector system is provided, including an in-core nuclear instrumentation thimble assembly that is substantially wholly contained within an instrument thimble within a nuclear fuel assembly. The instrument thimble assembly includes a self-powered, fixed, in-core detector for monitoring a reactor core parameter indicative of a state of the reactor core and providing an electric output representative of the monitored parameter. The instrument thimble assembly also includes a wireless transmitter that is connected to receive the electrical output from the self-powered fixed in-core detector and wirelessly transmit that signal to a location outside the reactor. Desirably, the wireless transmitter comprises a number of electronic components at least one of which is a vacuum microelectronic device and, preferably, a vacuum diode placed in a grid circuit of an amplifier which is connected to the electrical output of the self-powered, fixed, in-core detector and responds substantially logarithmically, thus enabling the electronic components to follow the monitored neutron flux from start-up to full power of a nuclear reactor in which the in-core detector system is disposed.

In another embodiment, in addition to the amplifier, the electronics components include a current-to-voltage converter and a voltage controlled oscillator with an output of the amplifier connected to an input of the current-to-voltage converter whose output is connected to an input of the voltage controlled oscillator that provides a frequency output proportional to a voltage on the input of the voltage controlled oscillator. In that way, the current which is the electrical output representative of the monitored parameter, which is connected to the amplifier, is converted to a corresponding frequency signal that can be transmitted by a wireless transmitter. In still another embodiment, the voltage controlled oscillator comprises a micro-electronic reactance tube.

Preferably, the electronic components comprise—an input of a first amplifier connected to the electrical output of the self-powered, fixed, in-core detector; the input of the current-to-voltage converter connected to an output of the amplifier; the input of the voltage controlled oscillator connected to the output of the current-to-voltage converter; an input of a second amplifier connected to the output of the voltage controlled oscillator; and a wireless transmission circuit connected to an output of the second amplifier for wirelessly transmitting the output of the second amplifier. Desirably, the nuclear reactor in-core detector system includes a wireless receiver circuit and signal conditioning component designed to be situated outside the highly radioactive environment of the nuclear reactor containment, and preferably, including conventional solid state components.

In still another embodiment, the nuclear reactor in-core detector system includes a wireless receiver positioned outside and within the vicinity of the reactor vessel for receiving signals from the wireless transmitter and a retransmitter for transmitting outside the containment the signals received from the wireless transmitter. Desirably, the retransmitter is a second wireless transmission circuit that transmits the signals received from the wireless transmitter to a second wireless receiver that communicates the signals received from the wireless transmitter, by way of the wireless receiver and the retransmitter, to processing circuitry outside the containment. Desirably, the second wireless receiver is positioned within the vicinity of a containment wall that shields the primary circuit of a nuclear power generation facility in which the in-core detector system is placed.

In a further embodiment, the invention comprises a nuclear fuel assembly having a top nozzle and a bottom nozzle and a plurality of thimble tubes extending between and substantially connected to the top nozzle and the bottom nozzle. At least one of the thimble tubes comprises an instrumentation thimble that houses and substantially completely contains the fixed in-core monitoring component of the detector system of this invention.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

The primary side of nuclear power generating systems which are cooled with water under pressure comprises a closed circuit which is isolated from and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume a pressurizer, pumps and pipes for circulating pressurized water, the pipes connecting each of the steam generators and pumps to the reactor vessel independently. Each of the parts of the primary side comprising a steam generator, a pump and a system of pipes which are connected to the vessel form a loop of the primary side.

Figure 4:
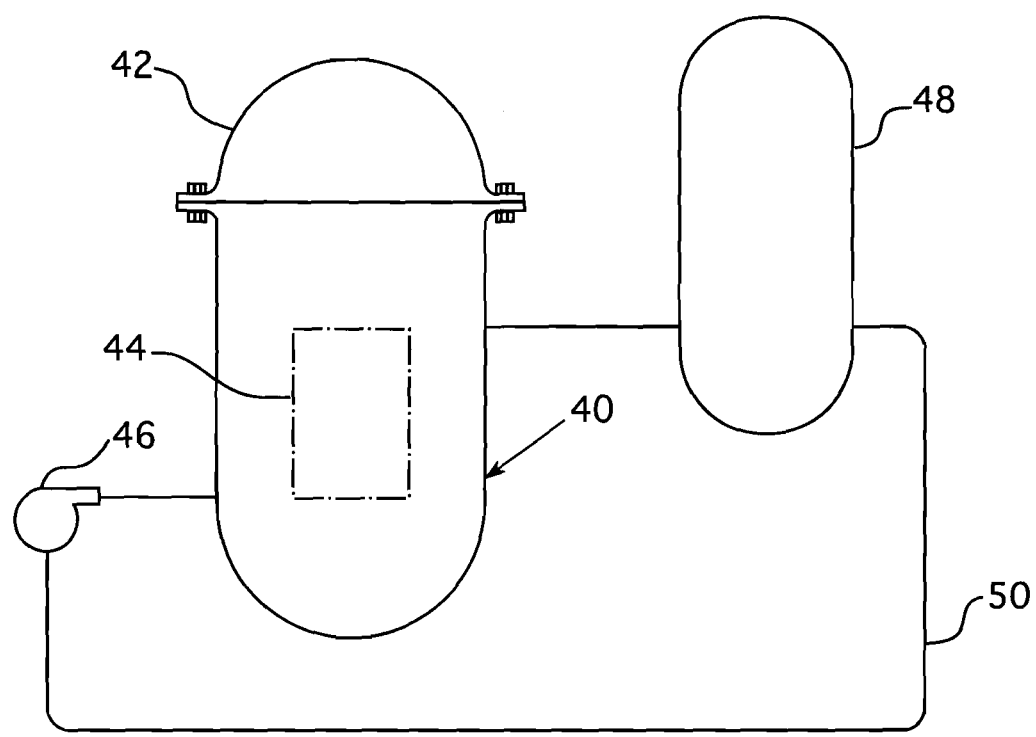
FIG. 4 is a simplified schematic of a nuclear reactor system to which this invention can be applied.

For the purpose of illustration, FIG. 4 shows a simplified nuclear reactor primary system, including a generally cylindrical reactor pressure vessel 40 having a closure head 42 enclosing a nuclear core 44. A liquid reactor coolant, such as water, is pumped into the vessel 40 by pump 46 through the core 44 where heat energy is absorbed and is discharged to a heat exchanger 48, typically referred to as a steam generator, in which heat is transferred to a utilization circuit (not shown), such as a steam driven turbine generator. The reactor coolant is then returned to the pump 46 completing the primary loop. Typically, a plurality of the above-described loops are connected to a single reactor vessel 40 by reactor coolant piping 50.

Figure 5:
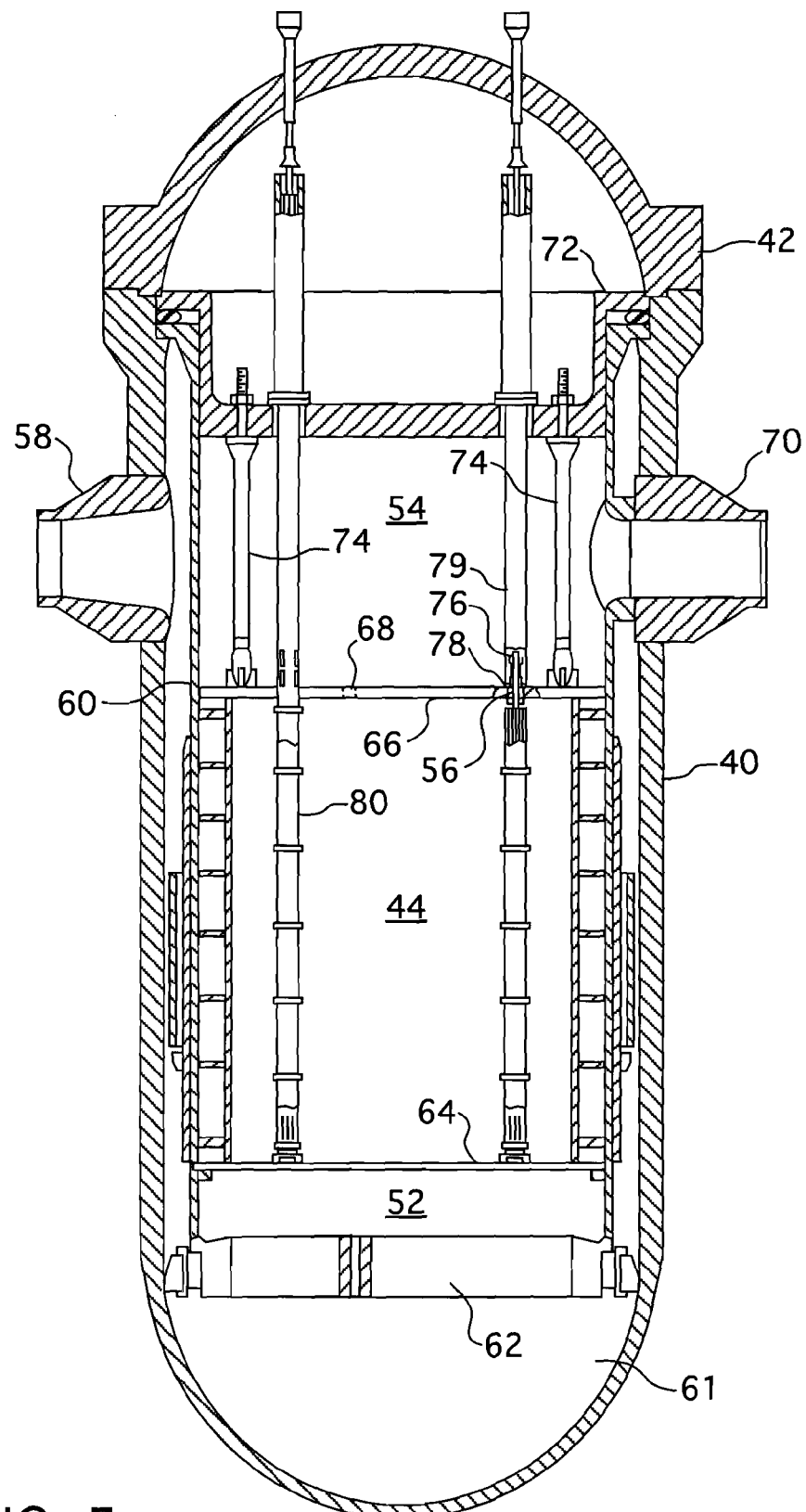
FIG. 5 is an elevational view, partially in section, of a nuclear reactor vessel and interior components to which this invention can be applied.

An exemplary reactor design incorporating this invention is shown in FIG. 5. In addition to the core 44 comprised of a plurality of parallel, vertical, co-extending fuel assemblies 80, for purposes of this description, the other vessel internal structures can be divided into the lower internals 52 and the upper internals 54. In conventional designs, the lower internals' function is to support, align and guide core components and instrumentation as well as direct flow within the vessel. The upper internals 54 restrain or provide a secondary restraint for the fuel assemblies 80 (only two of which are shown for simplicity in this figure), and support guide instrumentation and components, such as control rods 56. In the exemplary reactor shown in FIG. 5, coolant enters the reactor vessel 40 through one or more inlet nozzles, flows down through an annulus between the vessel 40 and the core barrel 60, is turned 180° in a lower reactor vessel plenum 61, passes upwardly through a lower support plate and a lower core plate 64, upon which the fuel assemblies 80 are seated, and through and about the assemblies. In some designs, the lower support plate 62 and the lower core plate 64 are replaced by a single structure, the lower core support plate that has the same elevation as 62. Coolant exiting the core 44 flows along the underside of the upper core plate 66 and upwardly and through a plurality of perforations 68 in the upper core plate 66. The coolant then flows upwardly and radially to one or more outlet nozzles 70.

The upper internals 54 can be supported from the vessel 40 or the vessel head 42 and includes an upper support assembly 72. Loads are transmitted between the upper support assembly 72 and the upper core plate 66 primarily by a plurality of support columns 74. Each support column is aligned above a selected fuel assembly 80 and perforation 68 in the upper core plate 66.

The rectilinearly movable control rods 56 typically include a drive shaft 76 and a spider assembly 78 of neutron poison rods that are guided through the upper internals 54 and into aligned fuel assemblies 80 by control rod guide tubes 79.

Figure 6:
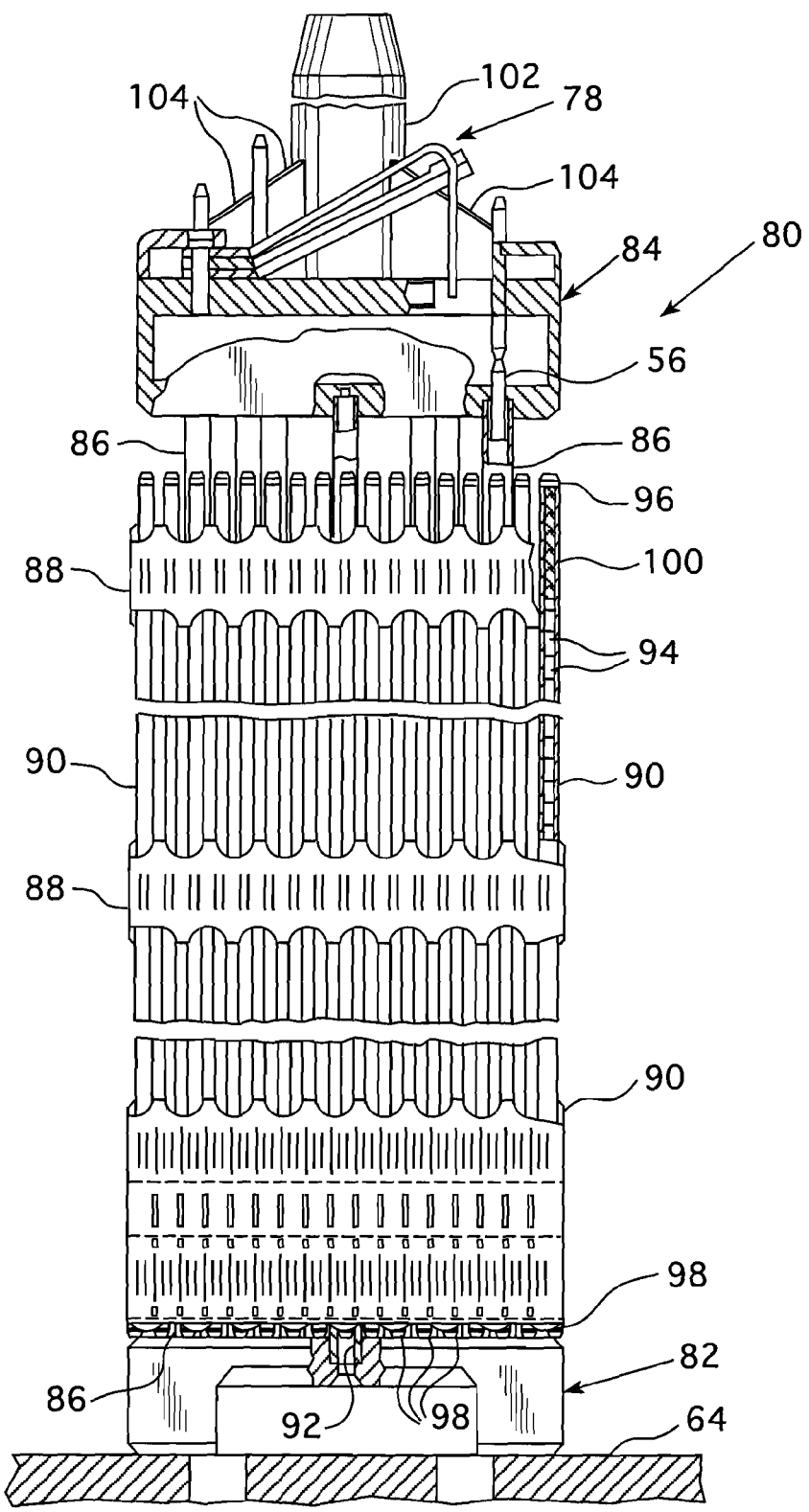
FIG. 6 is an elevational view, partially in section of a nuclear fuel assembly that contains the in-core nuclear instrument thimble assembly of this invention.

FIG. 6 is an elevational view represented in vertically shortened form, of a fuel assembly being generally designated by reference character 80. The fuel assembly 80 is the type used in a pressurized water reactor and has a structural skeleton which at its lower end includes a bottom nozzle 82. The bottom nozzle 82 supports the fuel assembly 80 on the lower core support plate 64 in the core region of the nuclear reactor. In addition to the bottom nozzle 82, the structural skeleton of the fuel assembly 80 also includes a top nozzle 84 at its upper end and a number of guide tubes or thimbles 86, which extend longitudinally between the bottom and top nozzles 82 and 84 and at opposite ends are rigidly attached thereto.

The fuel assembly 80 further includes a plurality of transverse grids 88 axially spaced along and mounted to the guide thimbles 86 (also referred to as guide tubes) and an organized array of elongated fuel rods 90 transversely spaced and supported by the grids 88. Although it cannot be seen in FIG. 6, the grids 88 are conventionally formed from orthogonal straps that are interleaved in an egg-crate pattern with the adjacent interface of four straps defining approximately square support cells through which the fuel rods 90 are supported in transversely spaced relationship with each other. In many conventional designs, springs and dimples are stamped into the opposing walls of the straps that form the support cells. The springs and dimples extend radially into the support cells and capture the fuel rods therebetween; exerting pressure on the fuel rod cladding to hold the rods in position. Also, the assembly 80 has an instrumentation tube 92 located in the center thereof that extends between and is mounted to the bottom and top nozzles 82 and 84. With such an arrangement of parts, the fuel assembly 80 forms an integral unit capable of being conveniently handled without damaging the assembly of parts.

As mentioned above, the fuel rods 90 in the array thereof in the assembly 80 are held in spaced relationship with one another by the grids 88 spaced along the fuel assembly length. Each fuel rod 90 includes a plurality of nuclear fuel pellets 94 and is closed at its opposite ends by upper and lower end plugs 96 and 98. The fuel pellets 94 are maintained in a stack by a plenum spring 100 disposed between the upper end plug 96 and the top of the pellet stack. The fuel pellets 94, composed of fissile material, are responsible for creating the reactive power of the reactor. The cladding, which surrounds the pellets, functions as a barrier to prevent the fission byproducts from entering the coolant and further contaminating the reactor systems.

To control the fission process, a number of control rods 56 are reciprocably movable in the guide thimbles 86 located at predetermined positions in the fuel assembly 80. Specifically, a rod cluster control mechanism (also referred to as the spider assembly) 78 positioned above the top nozzle 84 supports the control rods 56. The control mechanism has an internally threaded cylindrical hub member 102 with a plurality of radially extending flukes or arms 104 that with the control rods 56 form the spider assembly 78 that was previously mentioned with respect to FIG. 5. Each arm 104 is interconnected to the control rods 56 such that the control mechanism 78 is operable to move the control rods vertically in the guide thimbles 86 to thereby control the fission process in the fuel assembly 80, under the motor power of control rod drive shaft 76 (shown in FIG. 5) which are coupled to the control rod hubs 102, all in a well known manner.

Figure 7:
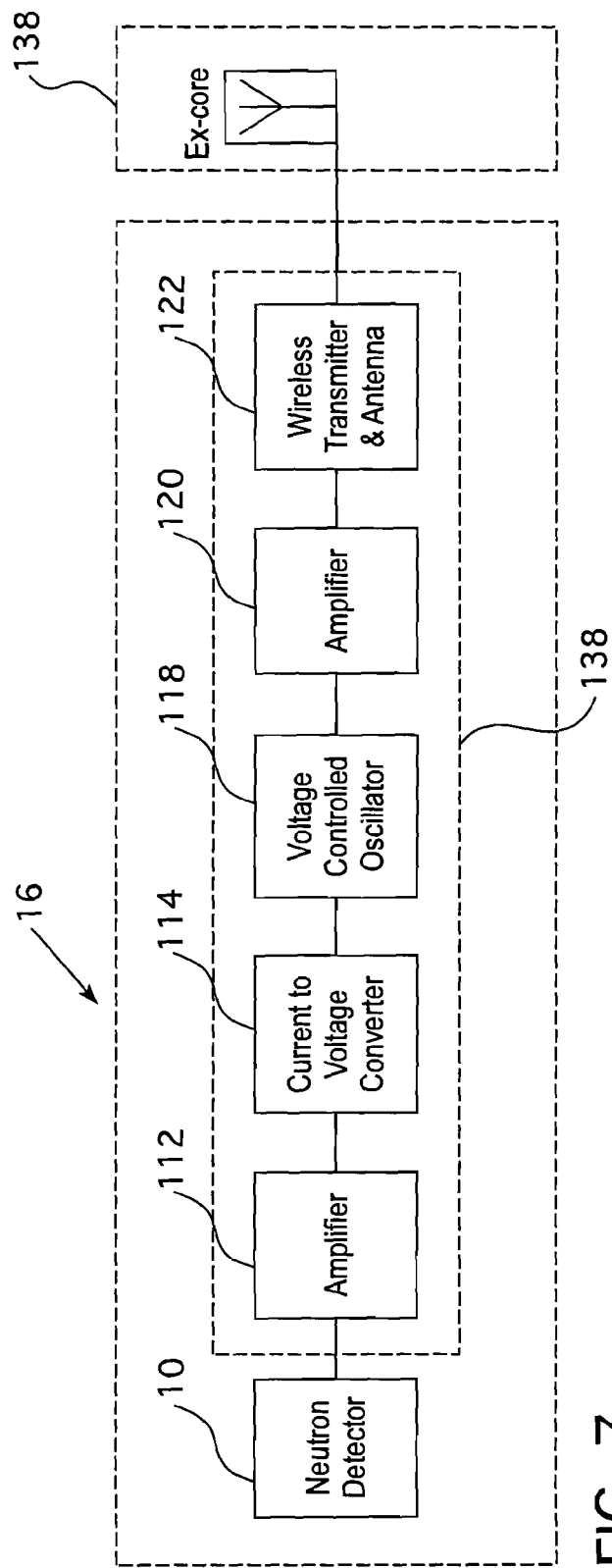
FIG. 7 is a block diagram of the electronics of this invention.

As mentioned above, in the AP1000 nuclear plant design, the in-core monitoring access is through the top of the reactor vessel, which is a significant departure from previous designs which fed the fixed in-core detector cables through the bottom of the vessel and into the fuel assembly instrument thimbles through the lower fuel assembly nozzle. The change in design means that during refueling all conventional in-core monitoring cabling will need to be removed before accessing the fuel. This invention provides a wireless in-core monitor that is wholly contained within the instrument thimble within the fuel assemblies without any tether that extends outside the core and would permit access to the fuel without going through the costly and time-consuming steps of removing and reconnecting the cabling. In accordance with this invention, the in-core instrument thimble assembly is illustrated as a block diagram in FIG. 7 and includes, in addition to the fixed in-core neutron detector, a self-contained power source and a wireless transmission circuit. Within the transmission circuit, the neutron detector output current is fed directly into an amplifier 112, thus eliminating cabling concerns. One or more stages of amplification are provided within the amplifier 112, using vacuum micro-electronic devices. A vacuum diode is preferably placed in the grid circuit of the amplifier to make the amplifier respond logarithmically, thus enabling the electronics to follow the neutron flux from start-up through full power. The amplified signal is then fed to a current-to-voltage converter 114. The output voltage of the current-to-voltage converter 114 is used as the input to a voltage controlled oscillator 118 which converts the voltage input to a frequency output. As the neutron flux changes, so will the voltage input to the voltage controlled oscillator, which will vary the output frequency. A vacuum micro-electronic reactance tube can be used for the voltage controlled oscillator 118. Such an arrangement provides a precise correlation between the neutron flux monitored by the neutron detector 10 and the output frequency of the voltage controlled oscillator 118. That output is then amplified by amplifier 120 whose output is communicated to a wireless transmitter 122 within the in-core instrument thimble assembly 16. The in-core instrument thimble assembly 16 can be made up of a single unit housing the neutron detector, power supply and transmission circuit or it can be made up of modular units, e.g., the self-contained power supply, neutron detector and transmission circuit, respectively.

Figure 1:
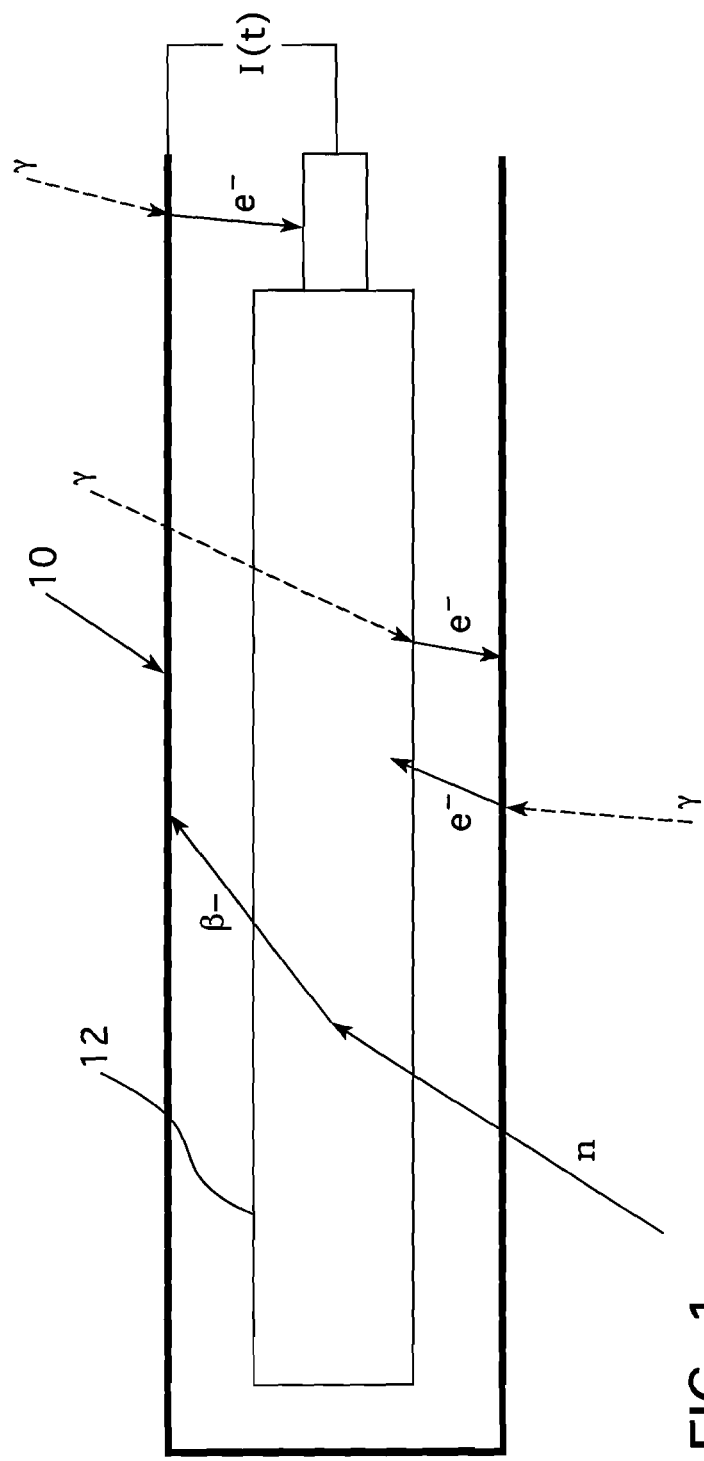
FIG. 1 is a schematic representation of a self-powered radiation detector.
Figure 2A:
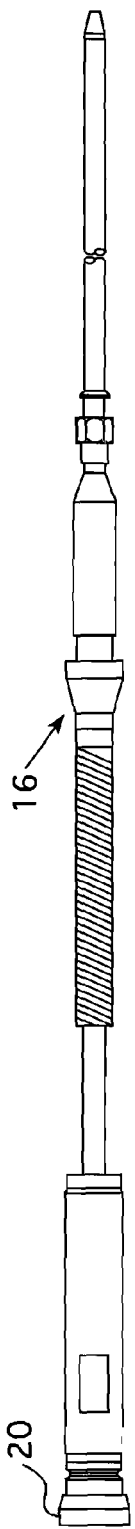
FIG. 2A is a plan view of an in-core instrument thimble assembly.
Figure 2B:
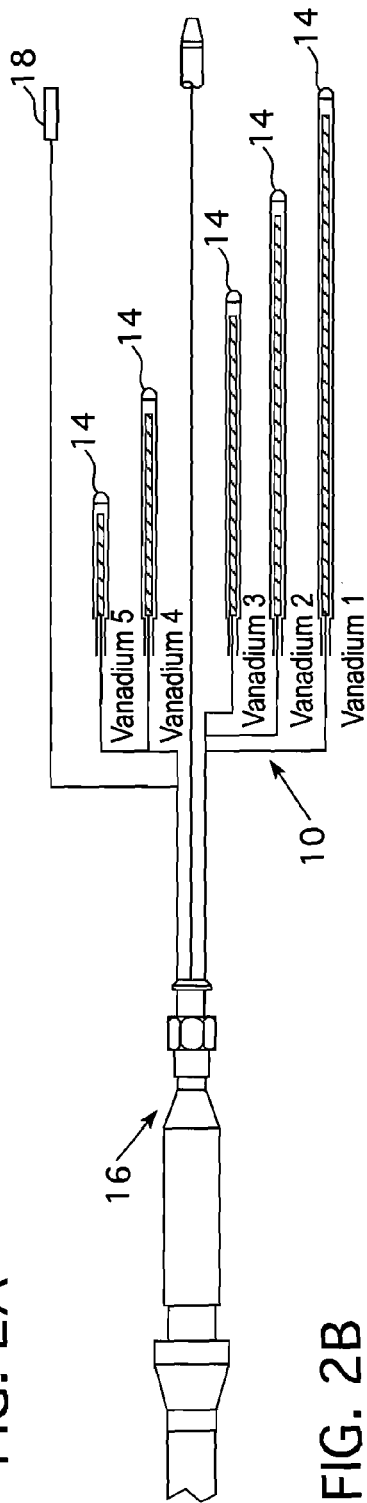
FIG. 2B is a schematic view of the interior of the forward sheath of the in-core instrument thimble assembly of FIG. 2A.
Figure 2C:
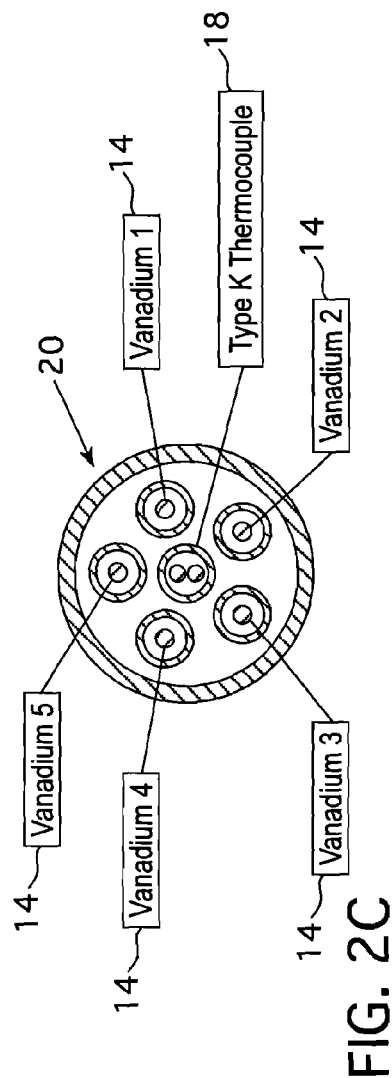
FIG. 2C is a sectional view of the electrical connector at the rear end of the in-core instrument thimble assembly of FIG. 2A.
Figure 8:
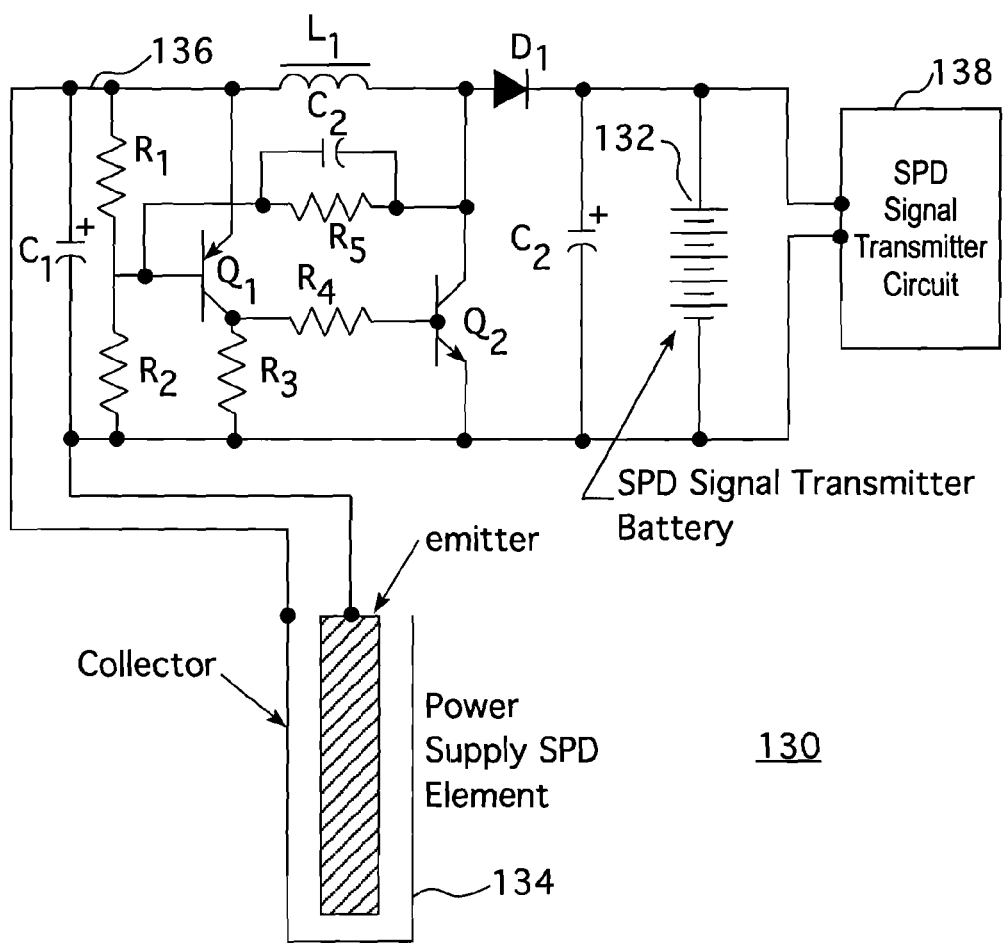
FIG. 8 is a schematic circuitry diagram of a power supply that can be employed by this invention to energize the electronic circuitry illustrated in FIG. 7.

The primary electrical power source for the signal transmitting electrical hardware is the rechargeable battery 132 shown as part of the exemplary power supply illustrated in FIG. 8. The charge on the battery 132 is maintained by the use of the electrical power produced by a dedicated power supply self-power detector element 134 that is contained within the power supply 130, so that the nuclear radiation in the reactor is the ultimate power source for the device, keeping the battery 132 charged. The power supply self-powered detector element 134 is connected to the battery 132 through a conditioning circuit 136 and the battery is in turn connected to the signal transmitter circuit 138 that transmits the signal received from the fixed in-core detector and the thermocouple monitoring the core such as was described with respect to FIGS. 2A, 2B and 2C. The self-contained power supply is more fully described in U.S. patent application Ser. No. 12/986,217.

Figure 3:
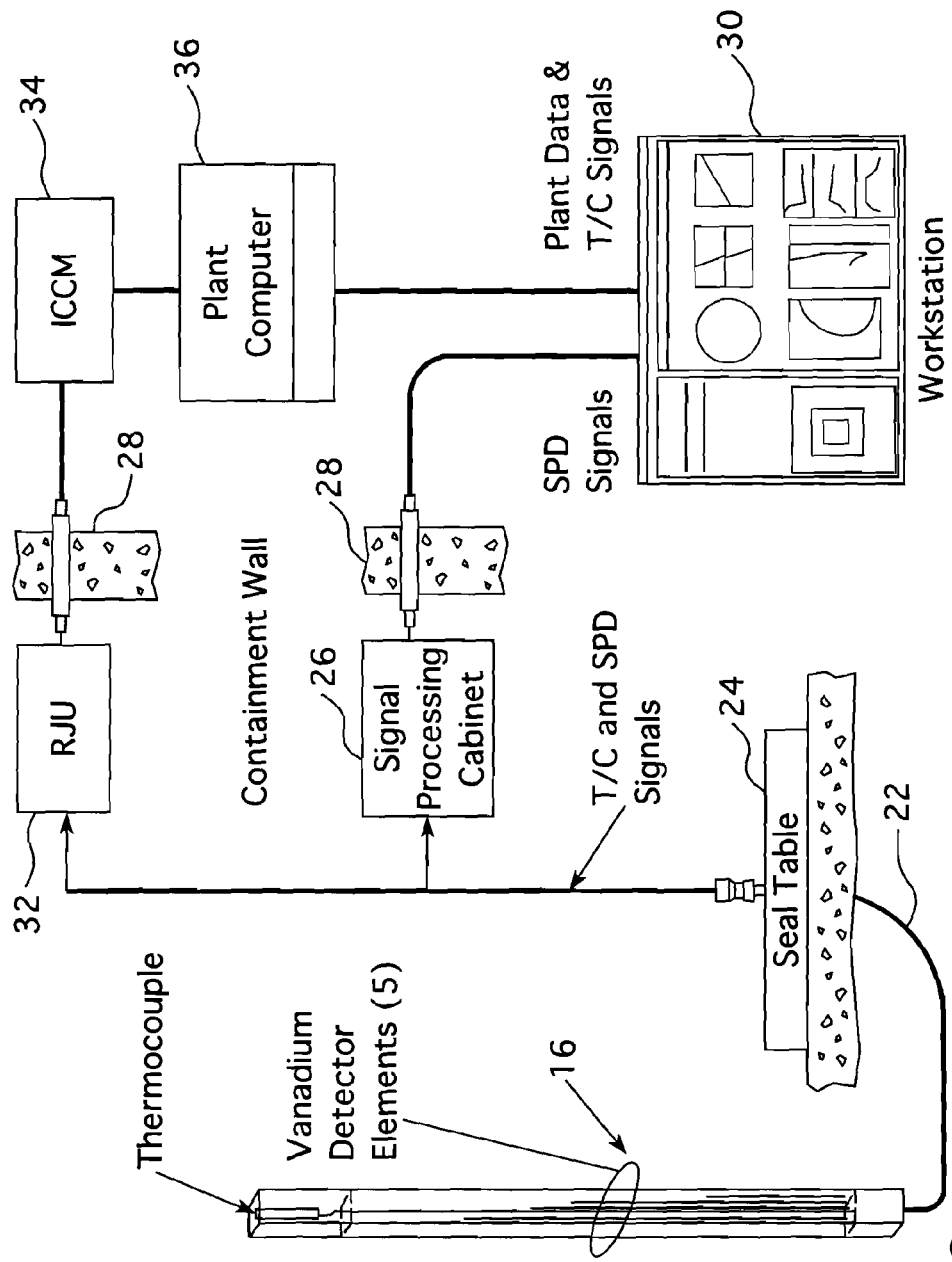
FIG. 3 is a schematic layout of an in-core monitoring system.
Figure 9:
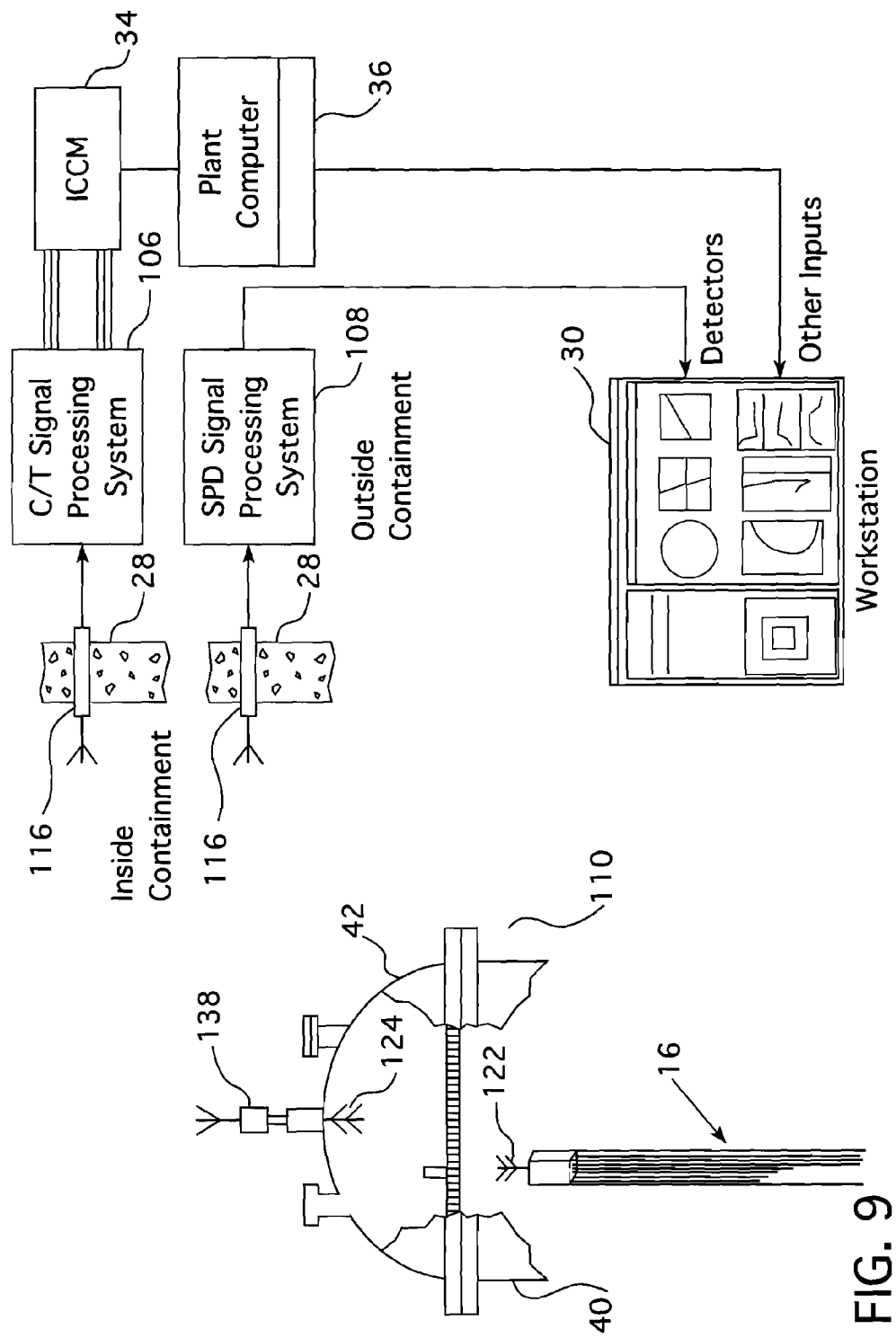
FIG. 9 is a schematic layout of a self-powered wireless in-core instrumentation core power distribution measurement system in accordance with this invention.

FIG. 9 shows a schematic layout of a self-powered wireless in-core detector instrumentation core power distribution measurement system constructed in accordance with this invention. The schematic layout illustrated in FIG. 9 is identical to the schematic layout illustrated in FIG. 3 for a conventional in-core monitoring system, except that the in-core instrument thimble assembly has been rotated 180° so that the electrical connectors for the detector element are closer to a receiver of the wireless transmitted signal and the cabling has been replaced by the wireless transmitters and receivers 122, 124, 138 and 116, the in containment electronics 26 and 32 have been respectively replaced by the SPD signal processing system 108 and the core exit thermocouple signal processing system 106, located outside the containment 28. In all other respects, the systems are the same.

As can also be appreciated from FIG. 9, the signal from the in-core instrument thimble assembly 16 wireless transmitter 122 is received by an antenna 124 on the underside of the reactor vessel head 42 which communicates with a combination wireless receiver and retransmitter 138 on the reactor head 42. In that way, the reactor head 42 can be removed and the fuel assemblies accessed without the in-core instrumentation being an obstacle. Placement of the transmitting antenna on the reactor vessel will depend on the reactor design but the intent is to transmit from a close proximity to the reactor vessel at a location that would not be an impediment to accessing the fuel assemblies. The neutron signal is then retransmitted by the retransmission circuit 138 to a receiver 116 proximate the containment outer wall. The combination receiver and retransmitter 138 should similarly be constructed from vacuum microelectronic devices because of their close proximity to the reactor vessel; however, the receivers 116 and the processing circuitry 106 and 108 can be constructed from conventional solid state components and may be located within the containment remote from the reactor vessel or outside the containment. Thus, this invention greatly simplifies the transmission of the in-core detector signals and the refueling operation.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor in-core detector system including an in-core nuclear instrument thimble assembly comprising:
  a self-powered, fixed, in-core detector for monitoring a reactor core parameter indicative of a state of a reactor core and providing an electrical output representative of the monitored parameter;
  a wireless transmitter connected to receive the electrical output, wherein the wireless transmitter comprises a number of electronic components at least one of which is a Vacuum Micro-Electric Device configured as a vacuum diode placed in a grid circuit of an amplifier which is connected to the electrical output of the self-powered, fixed, in-core detector and responds substantially logarithmically, thus enabling the electronic components to follow the monitored neutron flux from startup through full power of a nuclear reactor in which the in-core detector system is disposed; and
  wherein substantially the entire in-core nuclear instrument thimble assembly is wholly contained within an instrument thimble within a nuclear fuel assembly without any in-core detector wiring external to the instrument thimble, inside a reactor vessel in which the in-core detector system is disposed.

2. The nuclear reactor in-core detector system of claim 1 wherein in addition to the amplifier the electronic components include a current-to-voltage converter and a voltage controlled oscillator with an output of the amplifier connected to an input of the current-to-voltage converter whose output is connected to an input of the voltage controlled oscillator that provides a frequency output proportional to a voltage on the input of the voltage controlled oscillator so that a current which is the electrical output representative of the monitored parameter which is connected to the amplifier is converted to a corresponding frequency that can be transmitted by the wireless transmitter wirelessly.

3. The nuclear reactor in-core detector system of claim 2 wherein the voltage controlled oscillator comprises a Micro-Electronic reactance tube.

4. The nuclear reactor in-core detector system of claim 1 wherein the electronic components comprise an input of a first amplifier connected to the electrical output of the self-powered, fixed, in-core detector, an input of a current-to-voltage converter connected to an output of the amplifier, an input of a voltage controlled oscillator connected to an output of the current-to-voltage converter, an input of a second amplifier connected to an output of the voltage controlled oscillator and a wireless transmission circuit connected to an output of the second amplifier for wirelessly transmitting the output of the second amplifier.

5. The nuclear reactor in-core detector system of claim 1 including a wireless receiver circuit and signal conditioning component designed to be situated remote from the reactor vessel, substantially including conventional solid state components.

6. The nuclear reactor in-core detector system of claim 1 including:
   a wireless receiver at least in part positioned outside and within the vicinity of the reactor vessel for receiving signals from the wireless transmitter; and
   a re-transmitter for transmitting to an area remote from the reactor vessel the signals received from the wireless transmitter.

7. The nuclear reactor in-core detector system of claim 6 wherein the re-transmitter is a second wireless transmission circuit that transmits the signals received from the wireless transmitter to a second wireless receiver that communicates the signals received from the wireless transmitter by way of the wireless receiver and the re-transmitter to processing circuitry remote from the reactor vessel.

8. The nuclear reactor in-core detector system of claim 7 wherein the second wireless receiver is positioned within the vicinity of a containment wall that shields a reactor power facility in which the in-core detector system is placed.

9. A nuclear fuel assembly having a top nozzle and a bottom nozzle and a plurality of thimble tubes extending between and substantially connected to the top nozzle and the bottom nozzle, at least one of the thimble tubes comprising an instrumentation thimble that houses a fixed in-core detector system comprising:
   a self-powered, fixed, in-core detector for monitoring a reactor core parameter indicative of a state of a reactor core and providing an electrical output representative of the monitored parameter;
   a wireless transmitter connected to receive the electrical output, wherein the wireless transmitter comprises a number of electronic components at least one of which is a Vacuum Micro-Electronic Device configured as a vacuum diode placed in a grid circuit of an amplifier which is connected to the electrical output of the self-powered, fixed, in-core detector and responds substantially logarithmically, thus enabling the electronic components to follow the monitored neutron flux from startup through full power of a nuclear reactor in which the in-core detector system is disposed; and
   wherein substantially the entire in-core nuclear instrument thimble assembly is wholly contained within an instrument thimble within a nuclear fuel assembly without any in-core detector wiring external to the instrument thimble, inside a reactor vessel in which the in-core detector is disposed.

10. The nuclear reactor in-core detector system of claim 9 wherein in addition to the amplifier the electronic components include a current-to-voltage converter and a voltage controlled oscillator with an output of the amplifier connected to an input of the current-to-voltage converter whose output is connected to an input of the voltage controlled oscillator that provides a frequency output proportional to a voltage on the input of the voltage controlled oscillator so that a current which is the electrical output representative of the monitored parameter which is connected to the amplifier is converted to a corresponding frequency that can be transmitted by the wireless transmitter.

11. The nuclear reactor in-core detector system of claim 10 wherein the voltage controlled oscillator comprises a Micro-Electronic reactance tube.

12. The nuclear reactor in-core detector system of claim 9 wherein the electronic components comprise an input of a first amplifier connected to the electrical output of the self-powered, fixed, in-core detector, an input of a current-to-voltage converter connected to an output of the amplifier, an input of a voltage controlled oscillator connected to an output of the current-to-voltage converter, an input of a second amplifier connected to an output of the voltage controlled oscillator and a wireless transmission circuit connected to an output of the second amplifier for wirelessly transmitting the output of the second amplifier.

13. The nuclear reactor in-core detector system of claim 9 including a wireless receiver circuit and signal conditioning component designed to be situated remote from the reactor vessel, substantially including conventional solid state components.

14. The nuclear reactor in-core detector system of claim 9 including:
   a wireless receiver at least in part positioned outside and within the vicinity of the reactor vessel for receiving signals from the wireless transmitter; and
   a re-transmitter for transmitting to an area remote from the reactor vessel the signals received from the wireless transmitter.

15. The nuclear reactor in-core detector system of claim 14 wherein the re-transmitter is a second wireless transmission circuit that transmits the signals received from the wireless transmitter to a second wireless receiver that communicates the signals received from the wireless transmitter by way of the wireless receiver and the re-transmitter to processing circuitry remote from the reactor vessel.

16. The nuclear reactor in-core detector system of claim 15 wherein the second wireless receiver is positioned within the vicinity of a containment wall that shields a reactor power facility in which the in-core detector system is placed.

* * * * *